United States Patent
Yamada et al.

(10) Patent No.: US 8,192,862 B2
(45) Date of Patent: Jun. 5, 2012

(54) BATTERY PACK AND METHOD OF MANUFACTURING THE SAME

(75) Inventors: Hiroyuki Yamada, Fukushima (JP); Fumihata Yamamoto, Fukushima (JP); Hiroshi Seino, Fukushima (JP); Masami Suzuki, Fukushima (JP); Masayuki Kageyama, Fukushima (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 12/242,420

(22) Filed: Sep. 30, 2008

(65) Prior Publication Data

US 2009/0098417 A1 Apr. 16, 2009

(30) Foreign Application Priority Data

Oct. 15, 2007 (JP) .................. 2007-268167

(51) Int. Cl.
*H01M 2/02* (2006.01)
*H01M 2/08* (2006.01)

(52) U.S. Cl. ...................... 429/177; 429/185

(58) Field of Classification Search ........... 429/121–347
See application file for complete search history.

(56) References Cited

U.S. PATENT DOCUMENTS

| | | | |
|---|---|---|---|
| 2005/0136324 A1 | 6/2005 | Yamada et al. | |
| 2007/0128513 A1* | 6/2007 | Hatta et al. | 429/176 |
| 2008/0254348 A1* | 10/2008 | Hatta et al. | 429/94 |
| 2009/0098416 A1* | 4/2009 | Hatta et al. | 429/7 |

FOREIGN PATENT DOCUMENTS

| | | |
|---|---|---|
| JP | 2004-165134 | 6/2004 |
| JP | 2005-166650 | 6/2005 |
| JP | 2007-123003 | 5/2007 |

OTHER PUBLICATIONS

Japanese Office Action issued on Oct. 13, 2009, for corresponding Japanese Patent Application JP 2007-268167.

* cited by examiner

*Primary Examiner* — Basia Ridley
*Assistant Examiner* — James Lee
(74) *Attorney, Agent, or Firm* — K&L Gates LLP

(57) ABSTRACT

A battery pack including a battery cell, a circuit board electrically connected to the battery cell, a first cover, and a second cover. The battery cell includes a battery element, a rectangular first packaging component, a recess, and a rectangular second packaging component. The battery element is housed in the recess, the first packaging component and the second packaging component are stacked so that the second packaging component covers the opening of the recess, the periphery of the opening is sealed, both ends of the second packaging component are abutted at the outer bottom surface of the recess of the first packaging component, and the first outer resin layer and the second inner resin layer are bonded by heat seal adhesive layer.

10 Claims, 10 Drawing Sheets

BATTERY PACK AND METHOD OF MANUFACTURING THE SAME

CROSS REFERENCES TO RELATED APPLICATIONS

The present application claims priority to Japanese Patent Application No. 2007-268167 filed in the Japanese Patent Office on Oct. 15, 2007, the entire content of which being incorporated herein by reference.

BACKGROUND

The present application relates to a battery pack having a non-aqueous electrolyte secondary battery housed therein, and a method of manufacturing the same, and in particular to a battery pack realizing high volumetric efficiency.

In recent years, a variety of portable electronic instruments, such as camera-integrated VTR (video tape recorder), mobile phone and laptop computer have become popular, under continuing efforts of downsizing and weight reduction. Accordingly, demands on batteries used as power sources of the portable electronic instruments are rapidly growing, raising further demands on battery design aimed at making the battery lighter, thinner, and more efficient in use of housing space in the instruments, in order to realize downsizing and weight reduction of the instruments. Lithium ion secondary battery, having large energy density and large output density, is most preferable as the battery capable of satisfying this sort of demands.

Among others, lithium ion polymer secondary battery using a gel-type polymer electrolyte is widely used, aimed at preventing leakage of the electrolyte which raises issues in a case where the related art liquid electrolyte is used. In the lithium ion polymer secondary battery, electrode terminals are connected, a strip-like positive electrode and a negative electrode having a polymer electrolyte coated on both surfaces thereof are stacked while placing a separator in between, and then rolled in the longitudinal direction to fabricate a battery element. The battery element is then packaged by a laminating film to thereby produce a battery cell, and the battery cell is then housed in a resin mold case to thereby produce a battery pack.

Alternatively, Japanese Patent Application Publication No. JP 2005-166650 (Patent Document 1) describes a battery pack which is no more necessarily to house a battery cell in a resin molding case and improved in the volumetric efficiency.

A configuration of a battery pack 1 described in Patent Document 1 is shown in FIG. 1. The battery pack 1 is composed of a battery cell 10 provided with a battery element, a circuit board 4 connected to a positive electrode terminal 2a and a negative electrode terminal 2b (occasionally referred to as "electrode terminals 2" hereinafter, unless otherwise specifically limited) lead out from the battery cell 10, a top cover 5a housing the circuit board 4 and engaged with the opening at lead out side (occasionally referred to as "top side", hereinafter) of the electrode terminal 2 of the battery cell 10, and a bottom cover 5b engaged with the opening at a side opposite to a top side of the battery cell 10 (occasionally referred to as "bottom side", hereinafter).

FIG. 2A to FIG. 2C show a state where the battery pack 1 is under manufacturing process. FIG. 2A is a top view of the battery cell 10 under the process of manufacturing, FIG. 2B is a side elevation of the battery cell 10 shown in FIG. 2A as viewed laterally from the right side thereof, and FIG. 2C is a side elevation of the battery cell 10 shown in FIG. 2A as viewed from the bottom side thereof.

As shown in FIGS. 2A to 2C, the battery cell 10 is configured as having a battery element 9 provided with a positive electrode terminal 2a and a negative electrode terminal 2b, packaged by a rectangular hard laminating film 6, and by a rectangular soft laminating film 7 having long sides almost equal to those of the hard laminating film 6 and short lines almost equal to or slightly smaller than those of the hard laminating film 6.

Sectional views of the hard laminating film 6 and the soft laminating film 7 are shown in FIG. 3A and FIG. 3B. The hard laminating film 6 composing the outermost package of the battery pack 1 has, as shown in FIG. 3A, a metal layer 6a composed of a hard metal material, an outer resin layer 6b formed on one surface of the metal layer, and an inner resin layer 6c formed on the other surface of the metal layer. On the other hand, as shown in FIG. 3B, the soft laminating film 7 has a metal layer 7a composed of a soft metal material, an outer resin layer 7b formed on one surface of the metal layer, and an inner resin layer 7c formed on the other surface of the metal layer.

The outer resin layer 6b and the outer resin layer 7b function as surface protection, and are typically composed of nylon (Ny) or polyethylene terephthalate (PET). On the other hand, the inner resin layer 6c and the inner resin layer 7c have function of bonding the hard laminating film 6 with the soft laminating film 7, or bonding the hard laminating film 6 with the top cover 5a and the bottom cover 5b, and is made of cast polypropylene (CPP).

The soft laminating film 7 has a recess 8 for housing the battery element 9, which is formed by drawing, for example. The hard laminating film 6 is stacked on the soft laminating film 7 such that the opening of the recess 8 is covered after the battery element 9 is housed in the recess 8. The hard laminating film 6 is stacked at a position slightly shifted rightward with respect to the soft laminating film 7, for example. In this way of stacking of the hard laminating film 6 and the soft laminating film 7, as shown in FIG. 2A, there are produced a right region in which only the hard laminating film 6 is positioned and the inner resin layer 6c is exposed, and a left region in which only the soft laminating film 7 is positioned and the inner resin layer 7c is exposed. The portion where the hard laminating film 6 and the soft laminating film 7 overlap is fused by heating, and thereby surrounding four lines of the battery element 9 are sealed.

Both of the left and right ends of the hard laminating film 6 and the soft laminating film 7 are folded so as to wrap the recess 8, and thereby the battery cell 10 having the openings on both ends is fabricated. FIG. 4 shows a cross-section of a portion where the hard laminating film 6 and the soft laminating film 7 abut with each other. As shown in FIG. 4, the films are molded such that short lines of both sides of the hard laminating film 6 are abut to slight space and face each other with the space in between, and short lines of both sides of the soft laminating film 7 are abut to slight space and face each other with the space in between. In this stage, a heat seal adhesive film 11, composed of a resin material, for example, is provided on the outer bottom surface of the recess 8. After the hard laminating film 6 and the soft laminating film 7 are deformed so as to wrap the battery element 9, the battery cell 10 is heated so as to melt the heat seal adhesive film 11, and whereby the outer bottom portion of the recess 8 and both end portions of the soft laminating film 7 are bonded.

In this process, the right region having only the hard laminating film 6 positioned therein and the left region having only the soft laminating film 7 positioned therein are bonded at the same time. By overlapping the hard laminating film 6 and the soft laminating film 7 while being slightly shifted from each other, the inner resin layer 6c of the hard laminating film 6 and the inner resin layer 7c of the soft laminating film 7 are opposed at the outer bottom surface of the recess 8, and are bonded by having a certain width.

In the battery cell 10, a positive electrode terminal 2a and the negative electrode terminal 2b are lead out from the sealed portion of the hard laminating film 6 and the soft laminating film 7. In this configuration, the portions where the positive electrode terminal 2a and the negative electrode terminal 2b come into contact with the hard laminating film 6 and the soft laminating film 7 are respectively provided with resin chips 3a and 3b. The resin chips 3a and 3b are excellent in adhesiveness with each metal material composing the positive electrode terminal 2a and the negative electrode terminal 2b, and can improve the adhesiveness of the positive electrode terminal 2a and the negative electrode terminal 2b, with the hard laminating film 6 and the soft laminating film 7.

SUMMARY

However, in the battery pack 1 described in Patent Document 1, structurally, four laminating films exist in the thickness direction of the battery pack, because the battery element is packaged using the hard laminating film 6 and the soft laminating film 7 of almost same size.

Moreover, wrapping of the battery pack 1, such that the short lines of the soft laminating film 7 are mutually faced, and the short lines of the hard laminating film 6 are mutually faced, raises a need of using the heat seal adhesive film 11 for the purpose of mutually bonding the outer resin layer 7c of the soft laminating film 7. Even a thin series of the heat seal adhesive film 11 has a thickness from 30 μm to 50 μm or around, and thinning beyond the range may degrade the handlability due to lack of rigidity of the film, and may be causative of wrinkle or folding in the process of bonding.

These laminating films and the heat seal adhesive film 11 may be an excessive thickness of the battery pack 1 in the thickness direction, and may degrade the volumetric efficiency of the battery pack 1.

In addition, the hard laminating film and the soft laminating film need be adhered by heating over a wide region, therefore defective products in which the hard laminating film and the soft laminating film are folded and bent may more likely to be produced, and whereby the yield ratio may be degraded.

Therefore, it is desirable to provide a battery pack of high volumetric efficiency and a method of manufacturing the same.

According to a first embodiment, there is provided a battery pack which includes a battery cell having a first opened end and a second opened end formed thereto, a circuit board electrically connected to the battery cell, a first cover housing the circuit board, and engaged with the first opened end, and a second cover engaged with the second opened end. The battery cell includes a battery element, a rectangular first packaging component provided with at least a first metal layer, a first outer resin layer formed on one surface of the first metal layer, and a first inner resin layer formed on the other surface of the first metal layer, a recess being formed from the first inner resin layer side to the first outer resin layer, and distance between the side periphery and the facing side edge of the recess being not larger than the depth of the recess. The battery cell further includes a rectangular second packaging component provided with at least a second metal layer, a second outer resin layer formed on one surface of the second metal layer, and a second inner resin layer formed on the other surface of the second metal layer. The battery element is housed in the recess, and the first packaging component and the second packaging component are stacked so that the second packaging component covers the opening of the recess. The periphery of the opening is sealed, and both ends of the second packaging component are abutted at the outer bottom surface of the recess of the first packaging component. The first outer resin layer and the second inner resin layer are bonded with the aid of heat seal adhesive layer having a thickness of 1 μm or larger and 20 μm or smaller interposed between the outer bottom surface of the recess of the first packaging component and both ends of the second packaging component, by being preliminarily provided to either of the first packaging component or the second packaging component.

The heat seal adhesive layer is preferably a heat seal adhesive resin having a melting point of 90° C. or higher and 180° C. or lower, and is particularly preferably composed of an ethylene-vinyl acetate copolymer. The heat seal adhesive layer preferably has a thickness of 1 μm or larger and 5 μm or smaller.

It is preferable that the heat seal adhesive layer is preliminarily formed on the surface of the second inner resin layer of the second packaging component, and is formed in a region excluding the edges of the second packaging component and the region where the second packaging component faces the battery element and the first packaging component.

The second metal layer of the second packaging component is preferably composed of a hard metal material, and the hard metal material is preferably an unannealed aluminum (JIS A3003P-H18) of (JIS A3004P-H18).

According to a second embodiment, there is provided a method of manufacturing a battery pack, including a battery element fabricating step for fabricating a battery element, a recess forming step for forming a recess in a rectangular first packaging component provided with a first metal layer, a first outer resin layer formed on one surface of the first metal layer, and a first inner resin layer formed on the other surface of the first metal layer, from the first inner resin layer side toward the first outer resin layer side, while making distance between the side periphery and the facing side edge of the recess is not larger than the depth of the recess;

a sealing step including housing the battery element in the recess, and stacking a rectangular second packaging component such that the heat seal adhesive layer faces the first packaging component and covers the opening of the recess, the rectangular second packaging component having a second metal layer, a second outer resin layer formed on one surface of the second metal layer, a second inner resin layer formed on the other surface of the second metal layer, and a heat seal adhesive layer having a thickness of 1 μm or larger and 20 μm or smaller preliminarily formed in a predetermined region of the second inner resin layer, whereby the periphery of the opening is sealed;

a molding step for molding such that the second packaging component wrap the recess, both ends of the second packaging component are abut, and whereby a first opened end and a second opened end are formed;

an bonding step for bonding the first outer resin layer and the second inner resin layer by allowing the heat seal adhesive layer, which is interposed between the outer bottom surface of the recess of the first packaging component and both ends of the second packaging component, to melt by heating at least the surface on which both ends of the second packaging component are positioned;

a circuit board connecting step for electrically connecting the battery element and a circuit board;

a first engaging step for housing the circuit board in a first cover, and engaging the first cover with the first opened end; and a second engaging step for engaging a second cover with the second opened end.

The above-described heat seal adhesive layer is preferably a layer composed of ethylene-vinyl acetate copolymer formed by printing process.

According to the first embodiment, the thickness of the battery pack may be reduced by the thickness corresponding to a single packaging component. Moreover, the thickness of the heat seal adhesive layer may be reduced to as small as approximately one-tenth as compared to a related art heat seal adhesive film, by preliminarily forming the heat seal adhesive layer on the packaging component. In addition, the battery pack may be configured as being less causative of folding and bending of the packaging component, in the process of bonding of the packaging component.

According to the second embodiment, a thin heat seal adhesive layer may be preliminarily provided on the laminating film with a high positional accuracy.

According to an embodiment, the thickness of the battery pack may be made thinner than related art in the structural portion other than the battery element, therefore, the volumetric efficiency of the battery pack is improved. Also the production yield of the battery pack may be improved, because the packaging component is less likely to cause folding, and because the heat seal adhesive film, poor in the handlability, is no more necessary.

Additional features and advantages are described herein, and will be apparent from the following Detailed Description and the figures.

DETAILED DESCRIPTION

Figure 1:
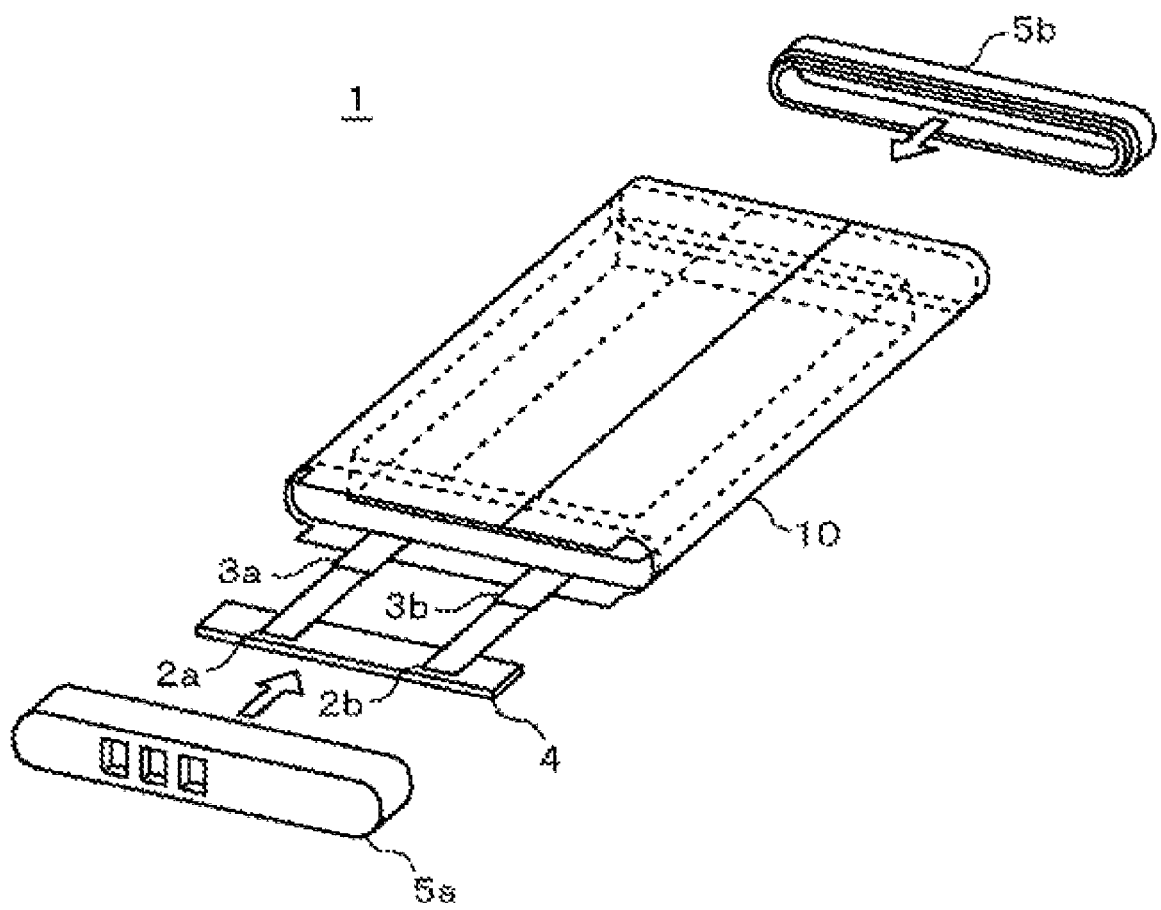
FIG. 1 is a schematic diagrammatic view showing configuration of a related art battery pack.

An embodiment will be explained below, referring to the drawings. It is to be noted that any portions appear in FIG. 5 to FIG. 15, correspondent to the configurations shown in FIG. 1 to FIG. 4, will be given with the same reference numerals. Also, in this specification, the battery element packaged with the hard laminating film and the soft laminating film is referred to as a battery cell, and a product obtained by connecting a circuit board to the battery cell, with a top cover and a bottom cover being engaged thereto is referred to as a battery pack. In the battery pack and the battery cell, the side where a positive electrode terminal and a negative electrode terminal are lead out will be referred to as a top portion, the side facing the top portion will be referred to as a bottom portion, and sides otherwise will be referred to as side portions. Length as viewed in the direction normal to the side portions will be defined as width, and length as viewed in the direction normal to the top portion and the bottom portion will be defined as height.

(1) Configuration of Battery Pack

Figure 5:
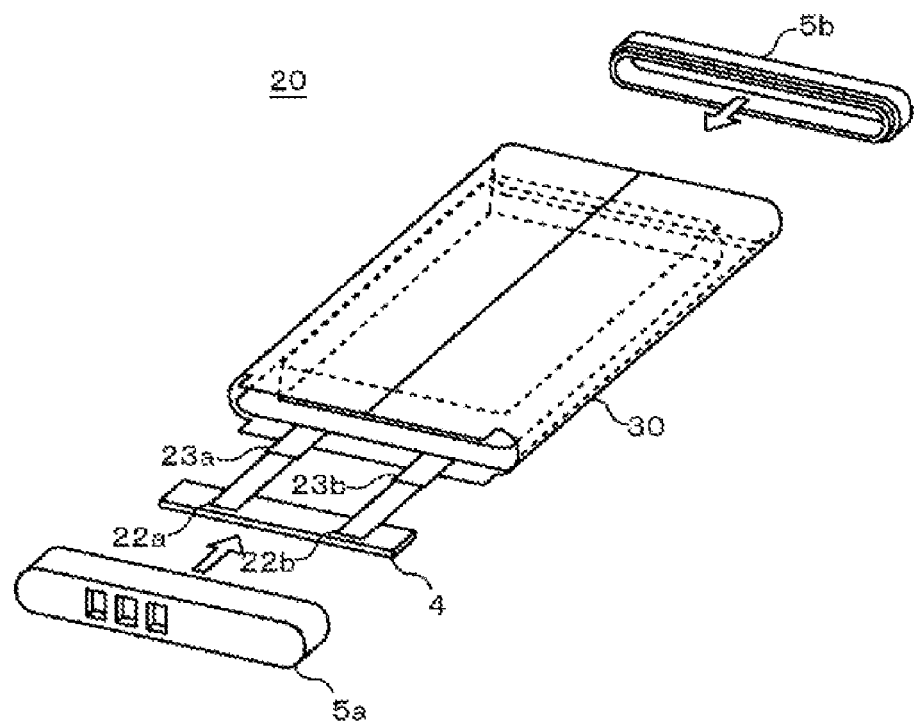
FIG. 5 is a schematic diagrammatic view showing a configuration example of a battery pack according to an embodiment.
Figure 6A:
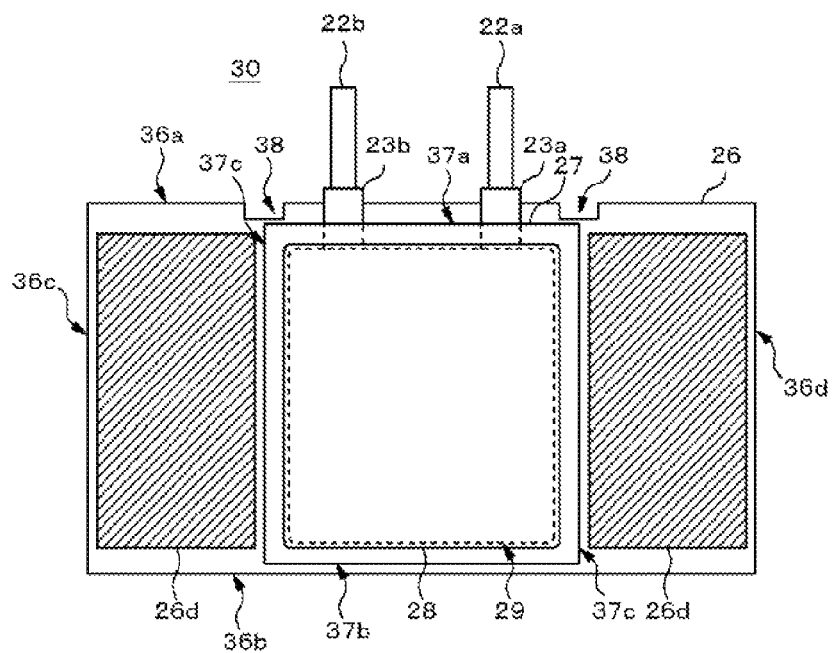
FIG. 6A to 6C are schematic diagrammatic views showing a state where a battery cell according to an embodiment is under manufacturing process.
Figure 6B:
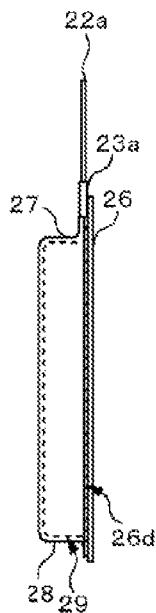
Figure 6C:
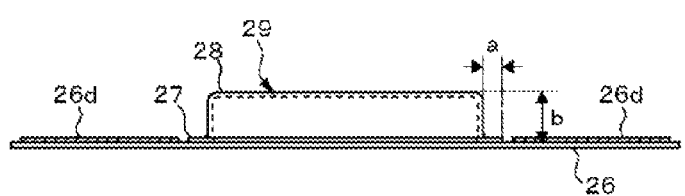

FIG. 5 shows an exemplary configuration of a battery pack 20 according to an embodiment. The battery pack 20 is, for example, a rectangular or flat-type battery pack of a lithium ion polymer secondary battery. As shown in FIG. 5, the battery pack includes a battery cell 30 in which both ends thereof are opened to form openings and a battery element is housed in a packaging component, a top cover 5a, and a bottom cover 5b respectively engaged with the openings of both ends of the battery cell 30.

FIG. 6 shows a state where the battery cell 30 according to an embodiment is under manufacturing process. The packaging component has a plate-like shape as a whole and is composed of a hard laminating film 26 having a rectangular form as viewed from a plane direction, and a rectangular soft laminating film 27 having a rectangular shape whose length in the direction normal to the side portions is shorter than that of the hard laminating film 26. Openings at both ends of the battery cell 30 have a rectangular form as a whole, and the both short lines thereof swell outwardly so as to form oval arcs.

The battery cell 30 is composed of the soft laminating film 27 having a recess 28 provided thereto, a battery element 29 housed in the recess 28, and a hard laminating film 26 provided so as to cover the opening of the recess 28 which houses the battery element 29. In a part of, and on the soft laminating film 27 side of, the hard laminating film 26, a heat seal adhesive layer 26d, adherable by heating with the soft laminating film 27, is preliminarily formed in a region left exposed without being faced to the soft laminating film 27.

From the sealed portion where the hard laminating film 26 and the soft laminating film 27 are sealed, a positive electrode terminal 22a and a negative electrode terminal 22b electrically connected respectively to the positive electrode and the negative electrode of the battery element 29 are lead out.

The top cover 5a and the bottom cover 5b have geometries engageable with the openings at both ends of the battery cell 30, and more specifically have a rectangular shape as a whole, as viewed from the front, and both short lines of the covers are swelled outwardly so as to form oval arcs. Noted, the front view herein means the direction viewing the battery cell 30 from the top side.

The packaging component, the battery element, the circuit board, the top cover 5a and the bottom cover 5b will be explained below referring to FIG. 5 to FIG. 8.

[Packaging Component]

As shown in FIG. 5 and FIGS. 6A to 6C, the packaging component is composed of the soft laminating film 27 provided with the recess 28 for housing the battery element 29, and the hard laminating film 26 stacked on the soft laminating film 27 so as to cover the recess 28. On a part of the hard laminating film 26, the heat seal adhesive layer 26d is preliminarily formed.

The hard laminating film 26 will be explained below.

The hard laminating film 26 has a rectangular form, and has a top-side long line 36a and a bottom-side long line 36b which are equal in the length, and side short lines 36c and 36d which are equal in the length. The length of the top-side long line 36a and the bottom-side long line 36b of the hard laminating film 26 is set such that both side short lines 36c and 36d may be abutted with each other, or may be face each other with a slight space in between, under a state where the film wrap the recess 28 having the battery element 29 housed therein.

The hard laminating film 26 may have notches 38 on the top-side long line 36a, as shown in FIG. 6. The notches 38 are provided such that they are positioned on both short lines as viewed from the front of the battery cell 30, as shown in FIG. 5. Provision of the notches 38 may make the engagement of the top cover 5a easy.

Figure 7A:
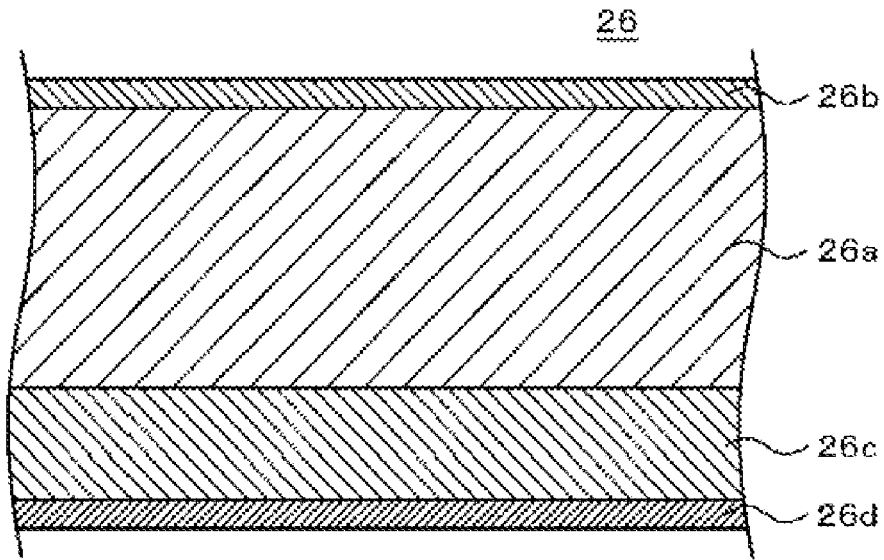
FIGS. 7A and 7B are sectional views respectively showing configurations of a hard laminating film and a soft laminating film used for the battery pack according to an embodiment.

FIG. 7A shows a sectional view of a portion where the heat seal adhesive layer 26d of the hard laminating film 26 is formed. The hard laminating film 26 is configured by stacking an outer resin layer 26b, a metal layer 26a, an inner resin layer 26c, and a heat seal adhesive layer 26d in this order.

The metal layer 26a functions as keeping the shape after being bent and resisting deformation caused by external, wherein a hard metal material, such as aluminum (Al), stainless steel (SUS), iron (Fe), copper (Cu) or nickel (Ni) may appropriately be used therefor. Among these, aluminum (Al) and stainless steel (SUS) are most preferable, and unannealed hard aluminum (JIS A3003P-H18) or (JIS A3004P-H18), or austenitic stainless steel (SUS304) is preferably used.

Thickness of the metal layer 26a is preferably adjusted to 50 μm or larger and 150 μm or smaller. The thickness below 50 μm may degrade the material strength. The thickness exceeding 150 μm may make the processing considerably difficult, and may thicken the hard laminating film 26, thereby the battery pack 20 may be degraded in the volumetric efficiency.

The outer resin layer 26b is formed using polyolefin-base resin, polyamide-base resin, polyimide-base resin, polyester or the like, in view of aesthetic of appearance, toughness, flexibility and so forth. More specifically, nylon (Ny), polyethylene terephthalate (PET), polyethylene naphthalate (PEN), polybutylene terephthalate (PBT), polybutylene naphthalate (PBN) may be used, while allowing combined use of a plurality of species selected therefrom.

Thickness of the outer resin layer 26b is preferably adjusted to 5 μm or larger and 15 μm or smaller. The thickness below 5 μm may degrade the function as a protective layer, and the thickness exceeding 15 μm may degrade the volumetric efficiency of the battery pack 20.

The outer resin layer 26b may not be provided in the case where a label or the like is wrapped as the outermost package of the battery pack 20.

The inner resin layer 26c is a portion melted and adhered under heating, and may be configured by using polyethylene (PE), cast polypropylene (CPP), polyethylene terephthalate (PET), low density polyethylene (LDPE), high density polyethylene (HDPE), linear low density polyethylene (LLDPE) or the like, allowing combined use of a plurality of species selected therefrom.

Thickness of the inner resin layer 26c is preferably adjusted to 20 μm or larger and 50 μm or smaller. The thickness below 20 μm may degrade the adhesiveness, and may make the pressure buffering performance insufficient. The thickness exceeding 50 μm may make the inner resin layer 26c more water-permeable, and may cause generation of gas inside the battery, and consequent swelling of the battery.

The heat seal adhesive layer 26d is a portion melted under heating, and sealed with the soft laminating film 27, and may be configured by using ethylene-vinyl acetate copolymer (EVA). The heat seal adhesive layer 26d may be formed by coating and drying EVA on the inner resin layer 26c by gravure printing, screen printing, flexographic printing or the like. By using gravure printing for the formation of the heat seal adhesive layer 26d, position of coating may be controlled under high accuracy.

The heat seal adhesive layer 26d is provided in the region where the inner resin layer 26c left exposed without facing the soft laminating film 27 the region excluding the edges on the top side and on the bottom side which may be brought into contact with the top cover 5a and the bottom cover 5b when they are engaged therewith, and the side edges which form the mating line when the battery cell 30 is formed. The heat seal adhesive layer 26d may preferably be formed as large as possible in the area, excluding the above-described region.

Thickness of the heat seal adhesive layer 26d may preferably be adjusted to 1 μm or larger and 20 μm or smaller, and more preferably 1 μm or larger and 5 μm or smaller. The thickness below 1 μm may degrade the adhesiveness, and the thickness exceeding 20 μm may degrade the volumetric efficiency.

EVA used for the heat seal adhesive layer 26d preferably has a vinyl acetate content of 30% by mass or more and 95% by mass or less. The content below 30% by mass may make EVA less soluble to a solvent such as alcohol, and may consequently make formation of the heat seal adhesive layer 26d difficult. The content exceeding 95% by mass may degrade the flexibility, and may consequently degrade the moldability of the hard laminating film 26.

For the purpose of improving coatability of the EVA film in the process of forming the heat seal adhesive layer 26d, EVA may partially be denatured by saponification, and as graft polymer containing acetoxy group, carboxyl group, hydroxyl group and so forth, the solubility into solvents may be improved.

The heat seal adhesive layer 26d may further preferably include a tackifier component for improving the adhesiveness and hot-tack performance with the inner resin layer 26c, and an anti-blocking agent for preventing blocking at a rolled state of the soft laminating film 27. The tackifier component and the anti-blocking agent are included in the range from 1% or more by mass to 20% or less by mass, or around, with respect to the resin.

The heat seal adhesive layer 26d may be configured by using any materials other than EVA, so far as the materials can melt at around 180° C. or below, and can ensure good adhesiveness with respect to both of the inner resin layer 26c of the hard laminating film 26 and the later-described outer resin layer of the soft laminating film 27. The heat seal adhesive layer 26d preferably has a melting point lower than that of the inner resin layer 26c. The heat seal adhesive layer 26d still more preferably has a melting point of 90° C. or above, taking environment of use of the battery pack 20 into consideration. By forming the heat seal adhesive layer 26d using a resin material having a melting point lower than that of the inner resin layer 26c, only the heat seal adhesive layer 26d may be melted in the process of fabricating the battery cell 30. Accordingly, it is possible to prevent that the resin material of the inner resin layer 26c is eluted from the portion where the short lines 36c and 36d of the hard laminating film 26 are abutted, or the inner resin layer 26c is melted together with the heat seal adhesive layer 26d and the resin material composing the inner resin layer 26c is flown out from portions where it is needed. The portions where the resin material composing the inner resin layer 26c is needed include, for example, opened ends of the battery cell 30 where the top cover 5a and the bottom cover 5b will be engaged later.

This sort of material may include an acid-denatured polypropylene (PP). If the heat seal adhesive layer 26d has a melting point exceeding 180° C., there may be a risk that the battery element 29 is damaged when fabricating the battery cell 30, or that the separator is melt and result in shut-down. After the heat seal adhesion, exfoliation strength between the hard laminating film 26 and the soft laminating film 27 is preferably 2 N/cm or above.

As has been described in the above, provision of the heat seal adhesive layer 26d makes it no more necessary to provide any separately-available heat seal adhesive film unlike in the related art process. The heat seal adhesive film is difficult to cut into a predetermined size due to its tacking property. Moreover, costs of the heat seal adhesive film are high, because the heat seal adhesive film is made once in a film form. The heat seal adhesive film is still also disadvantageous in that it is poor in handlability, and may sometimes require other base materials in order to place it to a predetermined position.

In contrast, the gravure printing hardly causes misalignment of position because highly tacky resin materials such as EVA may be coated in a predetermined position in a highly accurate manner. Further, because the heat seal adhesive layer 26d having a thickness which is around one-tenth of that of the heat seal adhesive film is preliminarily formed on the hard laminating film 26, it is no more necessary to use any excessive base material, the amount of use of the resin material per se may be reduced, and whereby the cost may be suppressed.

The soft laminating film 27 will be explained below.

The soft laminating film 27 has a rectangular form, and has a top-side short line 37a and a bottom-side short line 37b which are equal in the length, side long lines 37c and 37d which are equal in the length, and the recess 28 for housing the battery element 29, the recess being formed at the center of the soft laminating film 27 by drawing, or the like. The length of the top-side short line 37a and the bottom-side short line 37b of the soft laminating film 27 is set to be larger than the width of the recess 28 having the battery element 29 housed therein. Although in one embodiment, two opposing lines of the top side and the bottom side of the soft laminating film 27 are assumed as the short lines, and two opposing side lines are assumed as the long lines, depending on shape of the battery element 29, the top side and the bottom side may be assumed as the long lines, and the side lines may be assumed as the short lines.

Both side long lines 37c and 37d of the soft laminating film 27 are made slightly shorter than both side short lines 36c and 36d of the hard laminating film 26. In this way, the soft laminating film 27 may be stacked on the hard laminating film 26 such that only the hard laminating film 26 resides at the top side and the bottom side of the battery cell 30. Because the inner resin layer 26c of the hard laminating film 26 is exposed in the portion where only the hard laminating film 26 exists, the top cover 5a and the bottom cover 5b may be engaged later by bonding them with the inner resin layer 26c by sealing under heating.

The recess 28 is preliminarily subject to drawing by use of a die so as to be formed into a shape conforming to the battery element 29. In this process, the recess 28 is formed such that the distance "a" between the side periphery of the recess 28 and the long line 37d as the side edge of the soft laminating film 27 is not larger than the depth "b" of the recess 28. The same will apply also to the other side portion. The portion between the periphery of the recess 28 and the end of the soft laminating film 27 is a sealing portion where the soft laminating film 27 is adhered with the hard laminating film 26. It is sufficient if the sealing portion has the adhesion width equal to or wider than required width (1.0 mm or wider, for example), and may not necessarily be adhered over the entire region.

Accordingly, the sealing width of both side portions between the hard laminating film 26 and the soft laminating film 27 may be made not larger than the depth of the recess 28, in other words, the thickness of the battery element, and whereby the soft laminating film 27 may be prevented from extending over the outer bottom of the recess 28. The thickness of the battery pack 20 may therefore be thinned by the thickness corresponding to a single laminating film, and whereby the volumetric efficiency may be improved. Further, the amount of use of the soft laminating film 27 may be reduced.

The distance "a" between the long line 37c or 37d and the end of the recess 28 is preferably adjusted to 0.5 mm or more, and more preferably to 1.0 mm or more, taking influences of moisture intrusion into consideration.

Figure 7B:
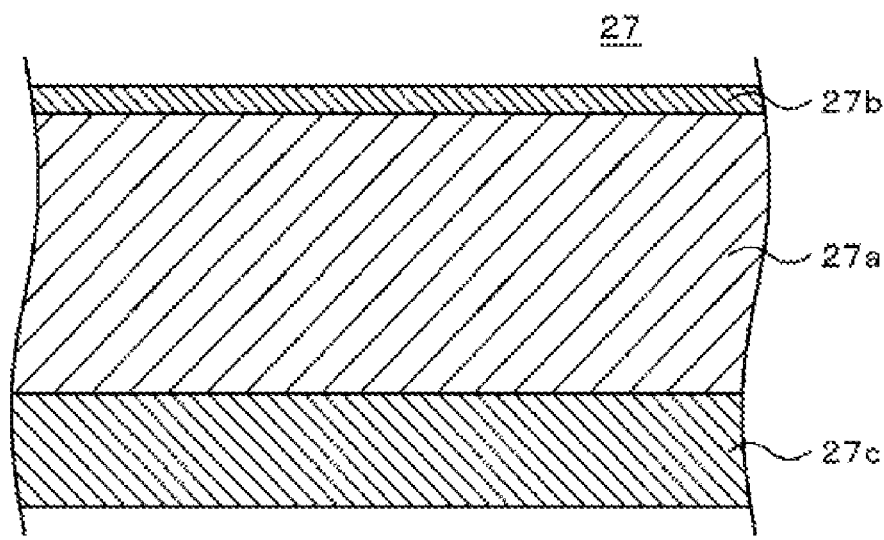

FIG. 7B shows a sectional view of the soft laminating film 27. The soft laminating film 27 is configured by stacking an outer resin layer 27b, a metal layer 27a, and an inner resin layer 27c, in this order.

The metal layer 27a has functions of improving strength of the packaging component, and also functions of preventing intrusion of moisture, oxygen and light so as to protect the battery element 29. A soft metal material, such as annealed aluminum (JIS A8021P-O) or (JIS A8079P-O), may preferably be used for the metal layer 27a.

Thickness of the metal layer 27a is preferably adjusted to 50 μm or larger and 150 μm or smaller. The thickness below 50 μm may degrade strength of the material. The thickness exceeding 150 μm may make the processing considerably difficult and may increase the thickness of the soft laminating film 27, whereby the volumetric efficiency of the battery pack 20 may be degraded.

For the outer resin layer 27b, materials similar to those composing the outer resin layer 26b of the hard laminating film 26 may be used. For the inner resin layer 27c, materials similar to those composing the inner resin layer 26c of the hard laminating film 26 may be used.

[Battery Element]

Figure 8:
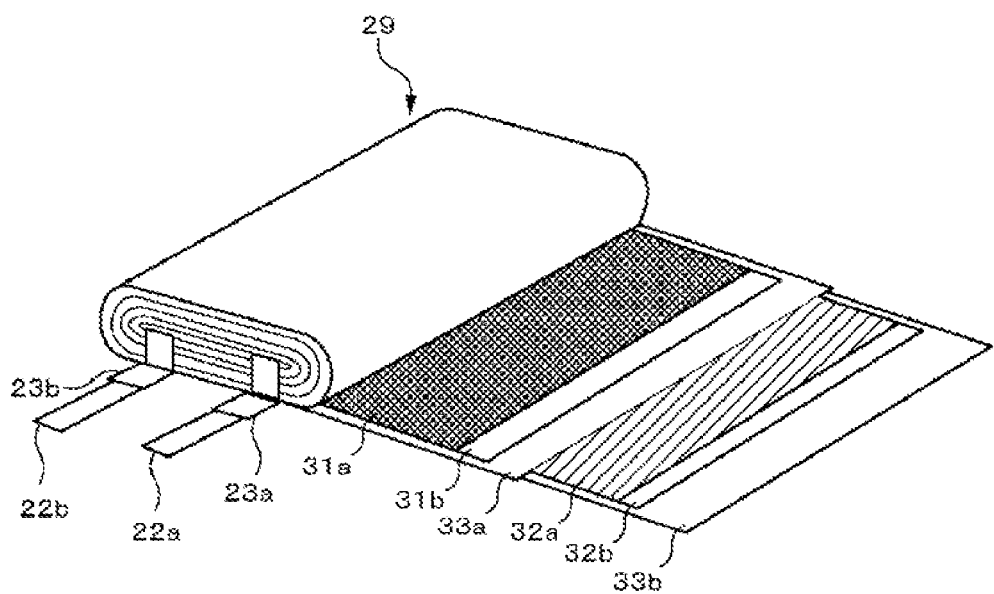
FIG. 8 is a schematic diagrammatic view showing a configuration of a battery element to be housed in the battery pack according to an embodiment

Next, the battery element 29 will be explained. FIG. 8 shows a configuration of the battery element 29 used for the battery pack 20. The battery element 29 is configured by stacking a strip-like positive electrode 31, a separator 33a, a strip-like negative electrode 32 disposed as being opposed to the positive electrode 31, and a separator 33b in this order, and rolled in the longitudinal direction. Polymer electrolyte layers (not shown) are formed on both surfaces of the positive electrode 31 and the negative electrode 32. From the battery element 29, the positive electrode terminal 22a connected to the positive electrode 31, and a negative electrode terminal 22b connected to the negative electrode 32 (occasionally referred to as "electrode terminal 22", if specific electrode terminals are not shown) are lead out. In the portions where the positive electrode terminal 22a and the negative electrode terminal 22b come into contact with the hard laminating film 26 and the soft laminating film 27, resin chips 23a and 23b are covered for the purpose of improving the adhesiveness.

[Positive Electrode]

The positive electrode 31 is configured by positive electrode active substance layers 31a, which contain a positive electrode active substance, formed on both surfaces of a positive electrode current collector 311b. As the positive electrode current collector 31b, a metal foil such as aluminum (Al) foil, nickel (Ni) foil, or stainless steel (SUS) foil may be used.

The positive electrode active substance layer 31a is configured, for example, by containing a positive electrode active substance, an electroconductive material, and a binder. As the positive electrode active substance, a composite oxide of lithium and transition metal(s), mainly composed of $Li_xMO_2$ (where, M represents one or more types of transition metals, and x is generally 0.05 or larger and 1.10 or smaller, depending on the state of charging and discharging of the battery), may be used. As the transition metal composing the lithium composite oxide, cobalt (Co), nickel (Ni), manganese (Mn) and so forth may be used.

The lithium composite oxide may specifically include lithium cobaltate ($LiCoO_2$), lithium nickelate ($LiNiO_2$), lithium manganate ($LiMn_2O_4$) and so forth. Also solid solution obtained by replacing a part of the transition metal element(s) with other element may be adoptable. For example, nickel-cobalt composite lithium oxides ($LiNi_{0.5}Co_{0.5}O_2$, $LiNi_{0.8}Co_{0.2}O_2$, etc.) may be exemplified. These lithium composite oxides can produce high voltage, and are excellent in the energy density. Alternatively, metal sulfides or metal oxides, containing no lithium, such as $TiS_2$, $MoS_2$, $NbSe_2$ or $V_2O_5$, may be used as the positive electrode active substance. A plurality of these materials may be used in a mixed manner as the positive electrode active substance.

As the electro-conductive material, a carbon material such as carbon black, graphite, or the like may be adoptable. As the binder, poly(vinylidene fluoride) (PVdF), poly(tetrafluoroethylene) (PTFE) or the like may be adoptable. As the solvent, N-methyl-2-pyrrolidone (NMP) or the like may be used.

[Negative Electrode]

The negative electrode 32 is configured by negative electrode active substance layers 32a, which contain a negative electrode active substance, formed on both surfaces of a negative electrode current collector 32b. As the negative electrode current collector 32b, a metal foil such as copper (Cu) foil, nickel (Ni) foil, or stainless steel (SUS) foil may be used.

The negative electrode active substance layer 32a is configured typically as containing a negative electrode active substance, an electro-conductive material, and a binder. As the negative electrode active substance, lithium metal, lithium alloy, carbon material allowing lithium to dope thereinto and to undope therefrom, or composite material of metallic material and carbon material. More specifically, the carbon material allowing lithium to dope thereinto and to undope therefrom may be exemplified by graphite, non-easy graphitizable carbon and easily graphitizable carbon, and still more specifically, carbon materials such as thermally decomposed carbons, cokes (pitch coke, needle coke, petroleum coke), graphites, vitreous carbon, sintered products of organic polymer compounds (phenol resin, furan resin and so forth carbonized by sintering at appropriate temperatures), carbon fiber and activated carbon may be adoptable. Still alternatively, also polymers such as polyacetylene and polypyrrole, and oxides such as $SnO_2$ may be adoptable as the material allowing lithium to dope thereinto and undope therefrom.

A variety of metals may be adoptable as the materials alloyable with lithium, among which most popularly used are tin (Sn), cobalt (Co), indium (In), aluminum (Al), silicon (Si) and alloys of these. For the case where metal lithium is used, lithium is not always necessarily used in a powder form and made up to a coating film together with a binder, but may be used in a form of rolled lithium metal plate.

The binder adoptable herein include poly(vinylidene fluoride) (PVdF), styrene-butadiene rubber (SBR) and so forth. The solvent adoptable herein include N-methyl-2-pyrrolidone (NMP), methyl ethyl ketone (MEK) and so forth.

[Electrolyte]

Electrolyte salts and non-aqueous solvents generally used for lithium ion secondary battery may be used for the electrolyte. Specific examples of the non-aqueous solvent include ethylene carbonate (EC), propylene carbonate (PC), γ-butyrolactone, dimethylcarbonate (DMC), diethyl carbonate (DEC), ethyl methyl carbonate (EMC), dipropyl carbonate (DPC), ethyl propyl carbonate (EPC), and solvents obtained by replacing hydrogen of these carbonate esters with halogen. Only a single species of these solvents may be used independently, or a plurality of species may be used in a mixed manner according to a predetermined composition.

The electrolyte salts adoptable herein may be those soluble to the non-aqueous solvent, and are configured by combination of cation and anion. For the cation, alkali metals and alkali earth metals are used. For the anion, $Cl^-$, $Br^-$, $I^-$, $SCN^-$, $ClO_4^-$, $BF_4^-$, $PF_6^-$, and $CF_3SO_3^-$ are used. More specifically, lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(pentafluoroethanesulfonyl)imide ($LiN(C_2F_5SO_2)_2$), and lithium perchlorate ($LiClO_4$) may be exemplified. Concentration of the electrolyte salt is sufficient if soluble to the solvents described in the above, but it is preferable if a lithium ion concentration is in the range from 0.4 mol/kg or more to 2.0 mol/kg or less with respect to the non-aqueous solvent.

For the case where the polymer electrolyte is used, the polymer electrolyte may be obtained by mixing the non-aqueous solvent and the electrolyte salt to prepare a gel-type electrolytic solution, and then by allowing a matrix polymer to take in the solution. The matrix polymer is characterized by its compatibility with the non-aqueous solvent. The matrix polymer includes silicone gel, acryl gel, acrylonitrile gel, polyphosphazene-modified polymer, polyethylene oxide, polypropylene oxide, and composite polymers or crosslinked polymers or modified polymers of the polymers. The fluorine-containing polymer may be exemplified by poly(vinylidene fluoride) (PVdF), copolymer containing vinylidene fluoride (VdF) and hexafluoropropylene (HFP) as the repeating units, and copolymer containing vinylidene fluoride (VdF) and trifluoroethylene (TFE) as the repeating units. Only a single species of these polymers may be used independently, or two or more species may be used in a mixed manner.

[Separator]

The separators 33a and 33b are typically configured by a porous film composed of polyolefin-base material such as polypropylene (PP) or polyethylene (PE), or a porous film composed of an inorganic material such as ceramic non-woven fabric, and may have a structure in which two or more porous films are stacked. Among these, the porous films of polyethylene and polypropylene are most effective.

It is generally preferable that thickness of the separator used herein is adjusted to 5 µm or larger and 50 µm or smaller, and more preferably to 7 µm or larger and 30 µm or smaller. Too thick separator may lower the amount of filling of the active substance and may decrease the cell capacity, thereby the ion conductivity may be lowered, and the current characteristics may degrade. Conversely, too thin separator may reduce mechanical intensity of the film.

[Circuit Board]

A circuit board 44 is a component to which the positive electrode terminal 22a and the negative electrode terminal 22b of the battery element 29 are electrically connected. The circuit board 44 has, as being mounted thereon, not only a protection circuit containing temperature protective elements such as fuse, PTC (positive temperature coefficient) element, thermistor and so forth, but also an ID resistor for identifying the battery pack, and has still also a plurality of (three, for example) contact points formed thereon. The protection circuit is provided with a charge/discharge control FETs (field effect transistors), an IC (integrated circuit) for monitoring the secondary battery and controlling the charge/discharge control FETs, and so forth.

The PCT element is connected in series with the battery element, and the electric resistance increases sharply when temperature of the battery becomes high compared to the set temperature, and whereby current flowing through the cell is substantially interrupted. Also the fuse is connected in series with the battery element, and is fused by self current when the overcurrent is flown in the battery, thereby the current is interrupted. The fuse is provided with a heater resistor in the vicinity thereof, and fused when excessive voltage is applied and temperature of the heater resistor is elevated, whereby current is interrupted.

The secondary battery may be brought into dangerous state, such as heat generation and ignition, if the terminal voltage of a secondary battery exceeds 4.3 V to 4.4 V. The protection circuit therefore monitors voltage of the secondary battery, turns off the charge control FET when the voltage exceeds 4.3 V to 4.4 V and becomes over-charged state was detected, so as to inhibit further charging. In addition, the secondary battery may be brought into internal short circuiting and may become incapable of re-charging, if the secondary battery is excessively discharged until the terminal voltage is decreased down to or less than the end-of-discharge voltage, and the secondary battery voltage becomes 0 V. The protection circuit therefore monitors voltage of the secondary battery, and turns off the discharge control FET when the over-discharge state was detected, so as to inhibit further discharge.

[Top Cover]

The top cover 5a is a component engaged with the opening on the top side of the battery cell 30, has a rectangular form as a whole as viewed from the front, and both sides on the short line side of the top cover is expanded outwardly so as to form oval arcs. On the surface of the top cover 5a at the battery element 29 side, there is provided a side wall to be engaged with the opening on the bottom side. The side wall is provided along a part of, or over the entire portion of, the outer periphery of the top cover 5a, and is bonded to the end of the hard laminating film 26 by heat seal adhesion.

The top cover 5a houses the circuit board 4. The top cover 5a has a plurality of openings provided at positions corresponded to contact points such that a plurality of the contact points of the circuit board 4 are externally exposed. The contact points of the circuit board 4 are brought into contact through the openings of the top cover 5a with a electronic equipment. In this way, the battery pack 20 and the electronic equipment are electrically connected. This sort of top cover 5a may preliminarily be fabricated by injection molding.

[Bottom Cover]

The bottom cover 5b is a component engaged with the opening on the bottom side of the battery cell 30, has a rectangular form as a whole as viewed from the front, and both sides on the short line side of the bottom cover is expanded outwardly so as to form oval arcs. On the surface of the bottom cover 5b at the battery element 29 side, there is provided a side wall to be engaged with the opening on the bottom side. The side wall is provided along a part of, or over the entire portion of, the outer periphery of the bottom cover 5b, and is bonded to the end portion of the hard laminating film 26 by heat seal adhesion.

The bottom cover 5b may have one or more, preferably two or more through-holes, which pass through from the surface facing the battery element 29 to the opposite surface. In this case, injection of a hot-melt resin from the through-holes may more strongly bond the battery cell 30 with the bottom cover 5b. Provision of two or more through-holes may successfully improve filling performance of the resin, because, in the process of injecting the resin, at least one through-hole may be used as a component for releasing the air between the battery element 29 and the bottom cover 5b.

This sort of bottom cover 5b may preliminarily be fabricated by injection molding. Another possible method may be such as placing the battery cell 30 in a die, and pouring a hot-melt resin into the bottom portion, so as to mold the cover as being integrated with the battery cell 30.

(2) Method of Fabricating Battery Pack

Paragraphs below will explain a method of manufacturing the battery pack 20, referring to FIG. 9 to FIG. 14.

[Fabrication of Battery Element]

A positive electrode active substance, an electro-conductive material, and a binder are homogeneously mixed to prepare a positive electrode mixture, and the positive electrode mixture is dispersed into a solvent to obtain a slurry state. The slurry is then uniformly coated over the positive current collector 31b typically by the doctor blade process, and dried under high temperatures to vaporize the solvent off, whereby the positive electrode active substance layer 31a is formed. The positive electrode active substance, the electro-conductive material, the binder and the solvent may be sufficient if they may uniformly be dispersed, and the ratio of mixing is not limited.

Next, the positive electrode terminal 22a is connected to one end of the positive current collector 31b by spot welding or ultrasonic welding. The positive electrode terminal 22a is preferably a metal foil or a mesh component, but may be material components other than metal so far as they are electro-chemically and chemically stable, and they can ensure electrical conduction. Material composing the positive electrode terminal 22a may be exemplified by aluminum (Al).

Next, a negative electrode active substance, an electro-conductive material if necessary, and a binder are homogeneously mixed to prepare a negative electrode mixture, and the negative electrode mixture is dispersed into a solvent to obtain a slurry state. The slurry is then uniformly coated over the negative current collector 32b typically by the doctor blade process, and dried under high temperatures to vaporize the solvent off, whereby the negative electrode active substance layer 32a is formed. The negative electrode active substance, the electro-conductive material, the binder and the solvent may be sufficient if they may uniformly be dispersed, and the ratio of mixing is not limited.

Next, the negative electrode terminal 22b is connected to one end of the negative current collector 32b by spot welding or ultrasonic welding. The negative electrode terminal 22b is preferably a metal foil or a mesh component, but may be material components other than metal so far as they; are electro-chemically and chemically stable, and they can ensure electrical conduction. Material composing the negative electrode terminal 22b may be exemplified by copper (Cu), nickel (Ni) and so forth.

The positive electrode terminal 22a and the negative electrode terminal 22b herein may preferably be lead out from the same direction, but may be lead out from any directions so far as they will not be causative of short circuiting or the like, and they will not adversely affect the battery performance. Place of attachment and method of attachment of the positive electrode terminal 22a and negative electrode terminal 22b are not limited to the above-described examples, so far as electrical connection may be ensured.

Next, the polymer electrolyte is coated over the positive electrode active substance layer 31a and the negative electrode active substance layer 32a, and then the positive electrode 31, the separator 33a, the negative electrode 32 and the separator 33b are stacked in this order, and the stack is rolled by multiple turns in the longitudinal direction, to thereby fabricate a rolled battery element 29.

[Fabrication of Battery Cell]

Figure 9:
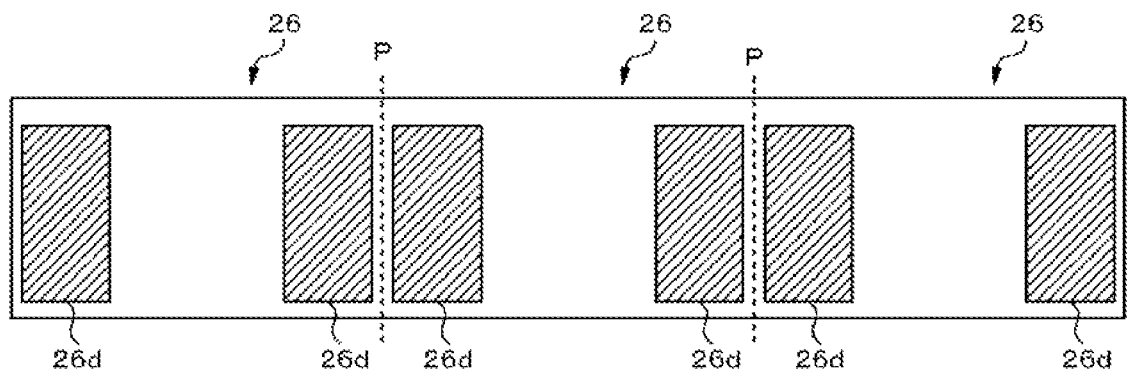
FIG. 9 is a schematic diagrammatic view showing a method of forming the hard laminating film according to an embodiment.

FIG. 9 shows a method of forming the hard laminating film 26 having heat seal adhesive layers 26d formed in predetermined portions thereof. The outer resin layer 26b and the inner resin layer 26c are formed respectively on both surfaces of the metal layer 26a to thereby fabricate a laminating film sheet, and the laminating film sheet is then cut such that the width of the laminating film sheet becomes equal to the length of the side short lines 36c and 36d of the hard laminating film 26. Next, on the inner resin layer 26c of thus cut laminating film sheet, EVA is coated typically by gravure printing at a predetermined pattern, and dried. In this way, a laminating film sheet having a plurality of hard laminating films 26 sequenced in one direction is fabricated. Thereafter, the sheet is cut at positions indicated by a reference symbol P in FIG. 9, at intervals equivalent to the length of the long line 36a of the hard laminating film 26. The notches may be provided, if necessary, on the long line composing the top side of the hard laminating film 26.

Besides the above-described method of cutting the laminating film sheet having the hard laminating film 26 sequenced only in one direction, the laminating film sheet having the hard laminating film 26 sequenced respectively in the longitudinal direction and in the transverse direction may be fabricated, and the hard laminating film 26 may be fabricated by cutting the sheet at predetermined positions. Still alternatively, the sheet may preliminarily be cut in size of the hard laminating film 26, and then the heat seal adhesive layer 26d may be formed.

The soft laminating film 27 cut in a predetermined size is subjected to drawing, and whereby the recess 28 for housing the battery element 29 is provided.

Figure 10:
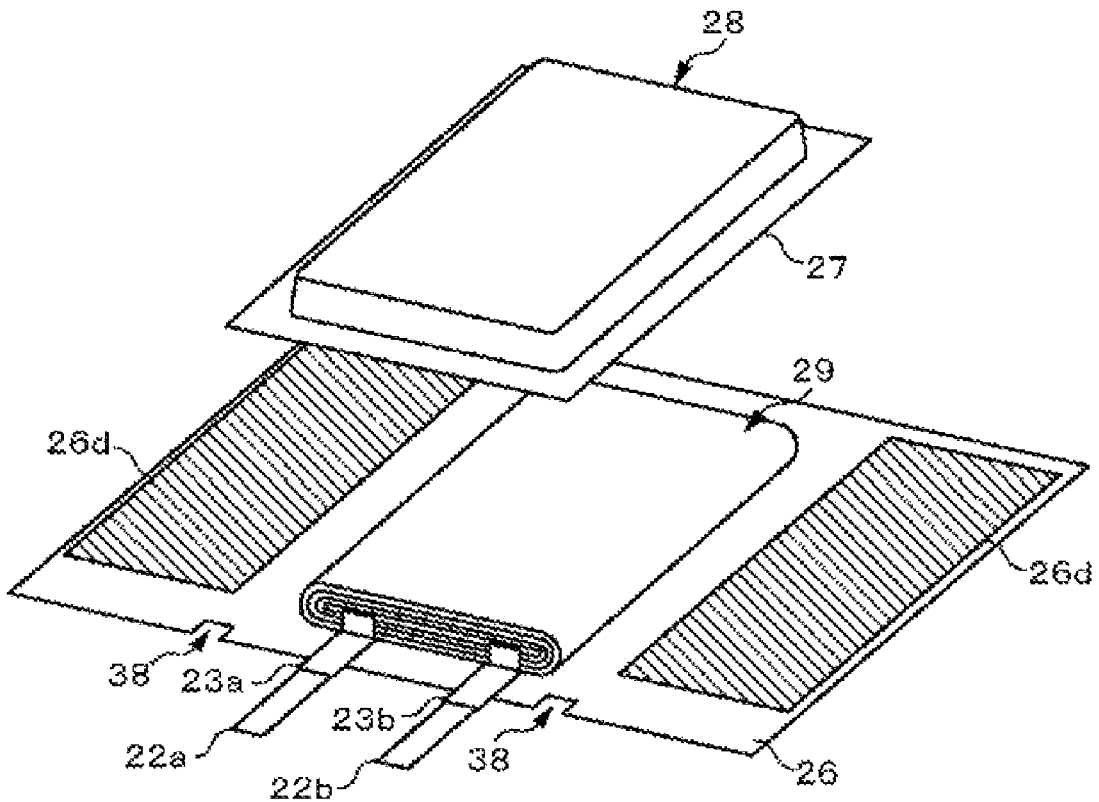
FIG. 10 is a schematic diagrammatic view showing steps of manufacturing the battery pack according to an embodiment.
Figure 11:
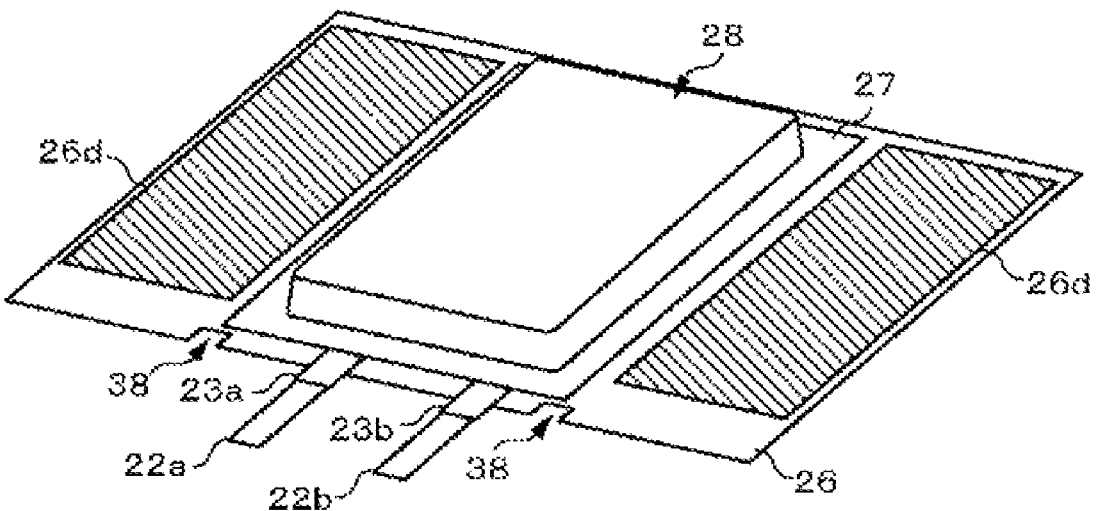
FIG. 11 is a schematic diagrammatic view showing steps of manufacturing the battery pack according to an embodiment.

Next, as shown in FIG. 10 and FIG. 11, the hard laminating film 26 and the soft laminating film 27 are disposed such that the heat seal adhesive layer 26d of the former faces the inner resin layer 27c of the latter. The hard laminating film 26 and the soft laminating film 27 are then stacked such that the battery element 29 is housed in the recess 28, and the opening of the recess 28 is covered with the hard laminating film 26. Thereafter, the hard laminating film 26 and the soft laminating film 27 are sealed along the periphery of the recess 28. The sealing is performed by using a metal heater head, not shown, by heat seal adhesion of the inner resin layer 26c of the hard laminating film 26 and the inner resin layer 27c of the soft laminating film 27 under reduced pressure.

Figure 12:
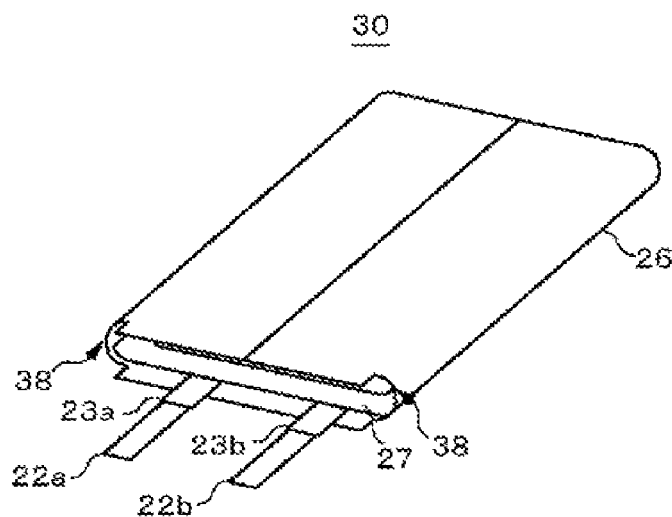
FIG. 12 is a schematic diagrammatic view showing steps of manufacturing the battery pack according to an embodiment.

Next, as shown in FIG. 12, the hard laminating film 26 is deformed such that the side short lines 36c and 36d are abutted. The surface having the matching line of the short lines 36c and 36d is heated using a heater head, so as to bond the heat seal adhesive layer 26d of the hard laminating film 26 and the outer resin layer 27b of the soft laminating film 27, to thereby fabricate the battery cell 30. The battery element 29 may be damaged if unnecessarily high temperature is applied thereto. For this reason, the heater head may have a temperature by which the resin material composing the heat seal adhesive layer 26d may be melted.

[Fabrication of Battery Pack]

Figure 13:
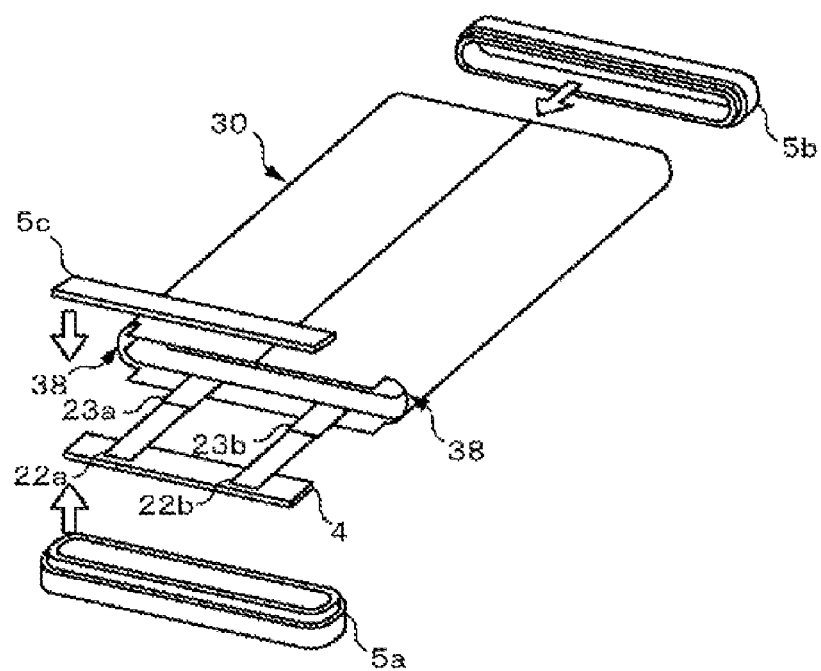
FIG. 13 is a schematic diagrammatic view showing steps of manufacturing the battery pack according to an embodiment.

Next, as shown in FIG. 13, the positive electrode terminal 22a and the negative electrode terminal 22b are connected to the circuit board 4, and the circuit board 4 is housed in the top cover 5a, using a holder 5c molded as being engageable with the top cover 5a. The top cover 5a is then turned so as to make the holder 5c at the battery cell 30 side, and the top cover 5a is engaged with the opening on the top side of the battery cell 30. Also the bottom cover 5b is engaged with the opening on the bottom side of the battery cell 30.

Figure 14:
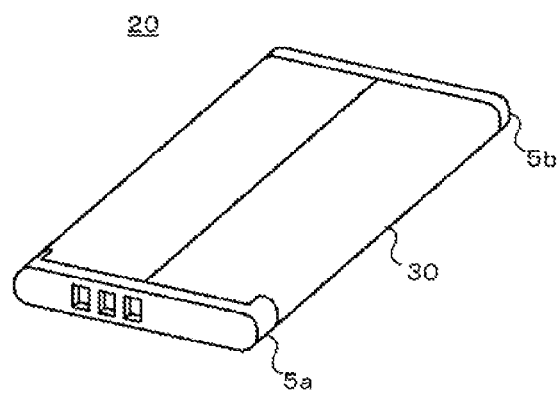
FIG. 14 is a schematic diagrammatic view showing an appearance of the battery pack according to an embodiment.

Finally, the engaged portion of the top cover 5a and the bottom cover 5b are respectively heated using a heater head, to thereby adhere the top cover 5a and the bottom cover 5b with the inner resin layer 26c of the hard laminating film 26. In this way, the battery pack 20 having an appearance shown in FIG. 14 is fabricated.

Figure 15:
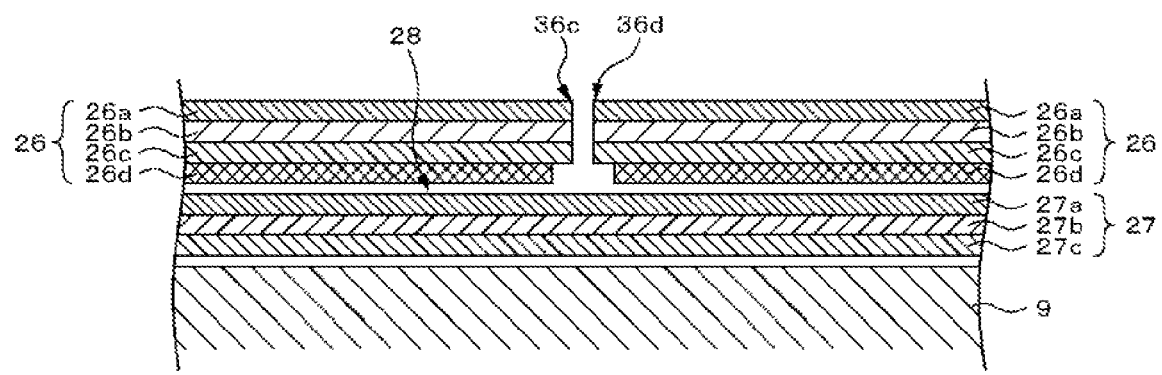
FIG. 15 is a sectional view showing a configuration of an abutted portion of the hard laminating film and the soft laminating film of the battery pack according to an embodiment.

FIG. 15 shows a section of the portion where the short lines 36c and 36d of the hard laminating film 26 are abutted. In the battery pack 20, only a single sheet of the hard laminating film 26 resides on the outer bottom surface of the recess 28 of the soft laminating film 27. Also the heat seal adhesive layer 26d having a thickness of 1 μm or larger and 20 μm or smaller is provided, in place of the heat seal adhesive film.

As has been described in the above, by using the hard laminating film 26 having the heat seal adhesive layer 26d preliminarily provided in the predetermined portions and the soft laminating film 27 having a side direction width narrower than that of the hard laminating film 26, the battery pack 20 may be fabricated without providing the separately-obtained heat seal adhesive film which has been provided. The heat seal adhesive layer 26d may be thinned sufficiently than the heat seal adhesive film, and the battery pack 20 may be improved in the volumetric efficiency, because a single laminating film which resides in the thickness direction of the battery pack 20 may be reduced.

Moreover, by preliminarily forming the heat seal adhesive layer 26d, a process of aligning the heat seal adhesive film or the like may become unnecessary, and thereby the manufacturing process may be shortened.

The related art heat seal adhesive film requires a high level of positional accuracy, and has a risk that defect products may be manufactured due to misalignment of the heat seal adhesive film, but by preliminarily forming the heat seal adhesive layer 26d, stable packaging may become possible. Heat seal adhesion between the laminating films over a wide range becomes unnecessary, and folding and bending of the laminating film caused in the process of heat seal adhesion may be prevented. Therefore, the yield may be improved.

EXAMPLES

Paragraphs below will specifically explain the present application based on Examples. It is to be noted that the present application is by no means limited to these Examples.

Example 1

Fabrication of Positive Electrode

Homogeneously mixed were 92% by weight of lithium cobaltate ($LiCoO_2$), 3% by weight of powdered poly(vinylidene fluoride), and 5% by weight of powdery graphite, and the mixture was dispersed in N-methyl-2-pyrrolidone, to adjust to a positive electrode mixture in a slurry state. The positive electrode mixture was uniformly coated on both surfaces of an aluminum (Al) foil which serves as the positive current collector, dried at 100° C. for 24 hours under reduced pressure, to thereby form a positive electrode active substance layer.

The product was then molded by applying pressure using a roll press machine, to thereby produce a positive electrode sheet, and the positive electrode sheet was then cut into the strip shape to produce the positive electrode. A positive electrode terminal composed of a aluminum (Al) ribbon was welded to a portion of the positive current collector, having no positive electrode active substance formed thereon. A resin chip composed of an acid-modified polypropylene was provided to the aluminum (Al) ribbon, in the portion thereof opposed with the laminating film later when packaged with the laminating film.

[Fabrication of Negative Electrode]

Homogeneously mixed were 91% by weight of artificial graphite, and 9% by weight of powdery poly(vinylidene fluoride), and the mixture was dispersed in N-methyl-2-pyrrolidone, to thereby adjust to a negative electrode mixture in a slurry state. The negative electrode mixture was then uniformly coated on both surfaces of a copper (Cu) foil which serves as the negative current collector, dried at 120° C. for 24 hours under reduced pressure, to thereby form a negative electrode active substance layer.

The product was then molded by applying pressure using a roll press machine, to thereby produce a negative electrode sheet, and the negative electrode sheet was then cut into a strip shape to produce the negative electrode. A negative electrode terminal composed of a nickel (Ni) ribbon was welded to a portion of the negative current collector, having no negative electrode active substance formed thereon. A resin chip composed of an acid-modified polypropylene was provided to the nickel (Ni) ribbon, in the portion thereof opposed with the laminating film later when packaged with the laminating film.

[Fabrication of Polymer Electrolyte]

A high polymer material having hexafluoropropylene (HFP) copolymerized at a ratio of 6.9% with vinylidene fluoride (VdF), a non-aqueous electrolytic solution, and dimethylcarbonate (DMC) as a diluting solvent were mixed, and the mixture was stirred and dissolved, to thereby obtain an electrolytic solution in a sol form. The electrolytic solution was prepared by mixing ethylene carbonate (EC) and propylene carbonate (PC) by a weight ratio of 6:4, and by dissolving 0.8 mol/kg of lithium hexafluorophosphate ($LiPF_6$) and 0.2 mol/kg of lithium tetrafluoroborate ($LiBF_4$). Ratio of mixing was adjusted to high polymer material:electrolytic solution:DMC=1:6:12 by weight. Next, the obtained sol-state electrolytic solution was uniformly coated on both surfaces of the positive electrode and negative electrode. The solvent was then removed, to thereby form the polymer electrolyte layers on both surface of the positive electrode and the negative electrode.

Next, the strip-shape positive electrode having the polymer electrolyte layers formed on both surfaces thereof and the strip-shape negative electrode having the polymer electrolyte layers formed on both surfaces thereof were rolled in the longitudinal direction, while placing the separator in between, and thereby the battery element was obtained. A porous polyethylene film of 10 μm thick and having hole ratio of 33% was used for the separator.

[Fabrication of Battery Cell]

The battery element fabricated as described in the above was packaged using the soft laminating film and the hard laminating film having geometries as shown in FIG. 6. The soft laminating film has the recess provided at the center thereof, the battery element was housed in the recess, and the opening of the recess was then covered with the hard laminating film. Four lines on the periphery of the opening was then heated using the heater head, to seal by heat adhesion. Width of sealing in the top portion herein was 2.0 mm, and width of sealing in the side portion was 3.0 mm. The soft laminating film used herein was such as having the metal layer composed of annealed soft aluminum (JIS A8021-O), the outer resin layer composed of nylon (Ny), and the inner resin layer composed of cast polypropylene (CPP). On the other hand, the hard laminating film used herein was such as having the metal layer composed of unannealed hard aluminum (JIS A3003P-H18), the outer resin layer composed of polyethylene terephthalate (PET), the inner resin layer composed of cast polypropylene (CPP), and the heat seal adhesive layer composed of EVA.

Next, the hard laminating film was deformed such that side short lines thereof are abutted. The surface on which the matching line of the hard laminating film resides was then heated using the heater head, so as to melt the heat seal adhesive layer, and thereby the battery cell was fabricated.

[Fabrication of Battery Pack]

The positive electrode terminal and the negative electrode terminal lead out from the battery cell were then connected to the circuit board, and the circuit board was then housed in the top cover. Finally, the top cover and the bottom cover were engaged respectively with the opening on the top side and the opening at the bottom side of the battery cell, the portions where the top cover and the bottom cover were engaged were heated using a heater block, to thereby fabricate the battery pack.

External dimensions of the battery pack were adjusted to be 6.15 mm in thickness, 41.0 mm in width, and 40.0 mm in height, and the battery element was optimized typically in the positive electrode, the negative electrode, and the thickness of the separator, conforming to the external dimension of the battery pack.

Comparative Example 1

Figure 2A:
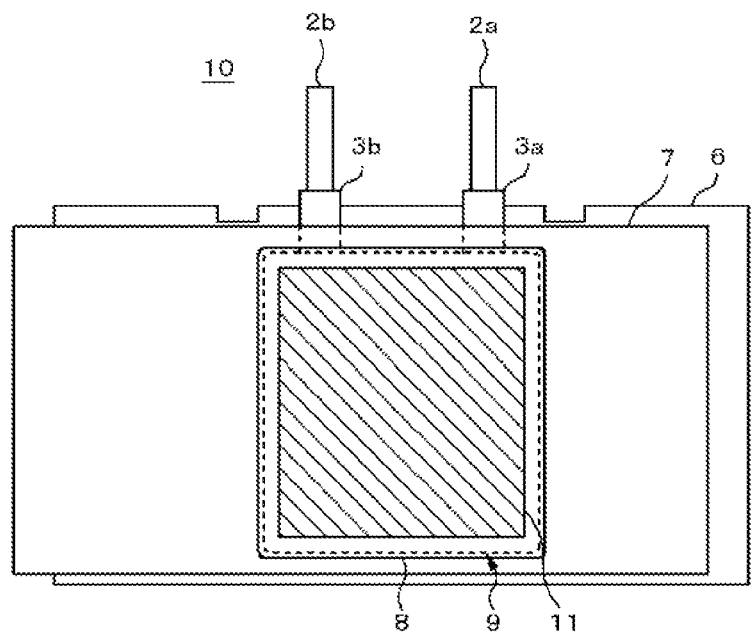
FIGS. 2A to 2C are schematic diagrammatic views showing a state where the related art battery pack is under manufacturing process.
Figure 2B:
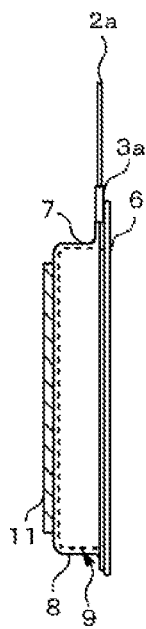
Figure 2C:
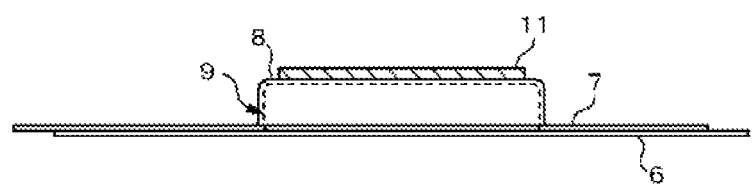
Figure 3A:
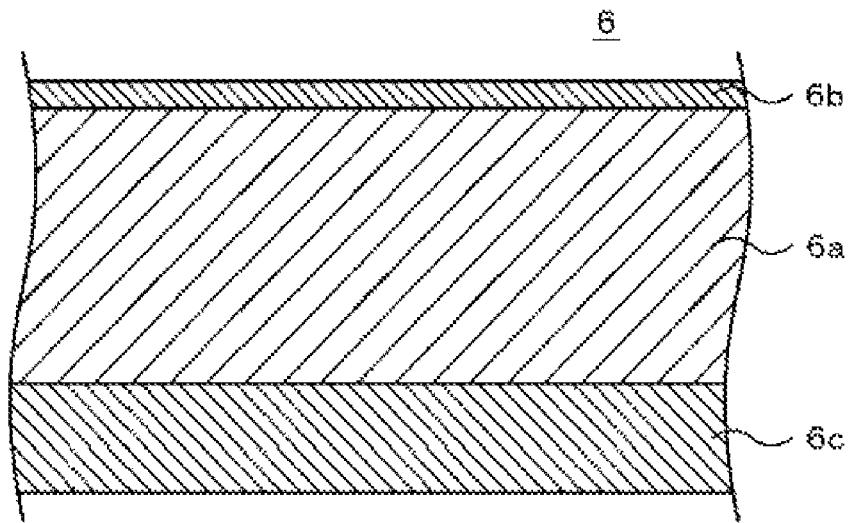
FIGS. 3A and 3B are sectional views showing a configuration of a hard laminating film and a soft laminating film used for the related art battery pack.
Figure 3B:
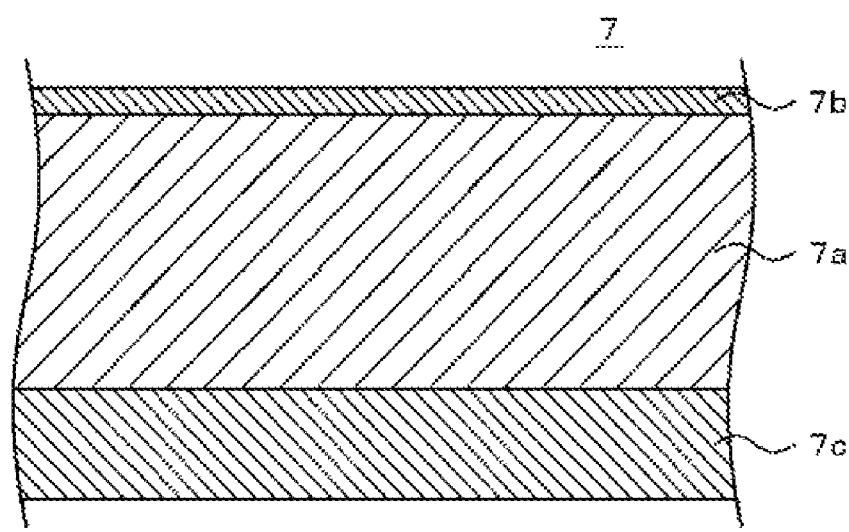
Figure 4:
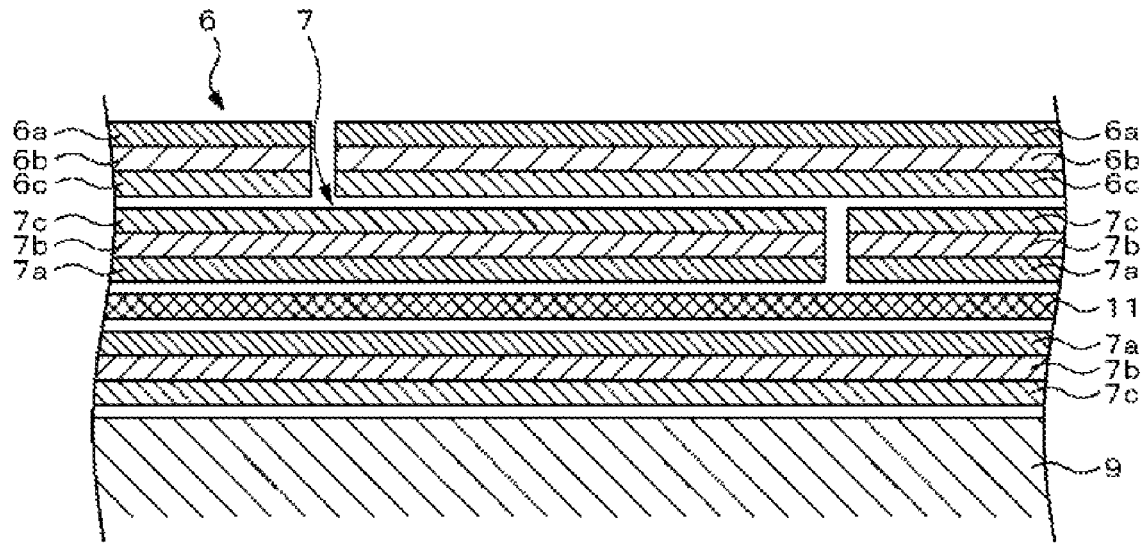
FIG. 4 is a sectional view showing a configuration of an abutted portion of the hard laminating film and the soft laminating film of the related art battery pack.

The hard laminating film was configured by forming the outer resin layer and the inner resin layer respectively on both surfaces of the metal layer. A battery pack was manufactured similarly to as described in Example 1, except that, the size of the soft laminating film was adjusted almost equal to that of the hard laminating film as shown in FIG. 2, and a heat seal adhesive film made of an EVA sheet of 50 μm thick was provided on the outer bottom surface of the recess provided to the soft laminating film so as to ensure adhesion between the soft laminating films.

Similarly to as in Example 1, external dimensions of the battery pack were adjusted to 6.15 mm in thickness, 41.0 mm in width, and 40.0 mm in height, and the battery element was optimized typically in the positive electrode, the negative electrode, and the thickness of the separator, conforming to the external dimension of the battery pack.

(a) Initial Capacity

Each of the battery packs thus obtained in Example 1 and Comparative Example 1 was charged under a constant current of 1000 mA until the cell voltage reached 4.2 V, and then further charged at a constant voltage of 4.2 V until the time of charging totaled up to 2.5 hours. Next, the battery pack was discharged at a constant current of 800 mA until the cell voltage reaches 3.0 V, and the discharge capacity was measured.

(b) Production Yield

One thousand battery packs were fabricated respectively for Example 1 and Comparative Example 1, and the production yield was calculated. The production yield was calculated by judging, out of the battery packs respectively in Example 1 and Comparative Example 1, battery packs in which folding of the laminating film is caused, and battery packs in which adhesion of the laminating film of the packaging component is insufficient, as being defect products.

Results are shown in Table 1 below.

TABLE 1

| | Initial capacity [mAh] | Production yield [%] |
|---|---|---|
| Example 1 | 1200 | 99.9 |
| Comparative Example 1 | 1180 | 99.2 |

As shown in Table 1, based on assumption that external sizes of the battery pack are equal, the battery pack of Comparative Example 1 based on the related art configuration showed an initial capacity of 1180 mAh, whereas the battery pack of Example 1 adopting the configuration of the present application showed an initial capacity of 1200 mAh, whereby making clear that the initial capacity is improved.

This is because the soft laminating film of the battery pack of Example 1 was made smaller than that of the battery pack of Comparative Example 1, and also because the heat seal adhesive layer as thick as approximately one-tenth of heat seal adhesive sheet was provided to the hard laminating film instead of the heat seal adhesive sheet. By adopting the configuration of Example 1, as compared with Comparative Example 1, the thickness may be reduced by the thickness corresponding to a single laminating film, approximately nine-tenths of the thickness of the heat seal adhesive film, and whereby the volumetric efficiency was improved.

The production yield of Example 1 was 99.9%, which was improved compared to 99.2% of Comparative Example 1. This is because, in Example 1, the hard laminating film and the soft laminating film are not required to be adhered by heat over a wide range as has been done, and folding of the laminating film may be prevented because the soft laminating film was fixed.

One embodiment of the present application has been described in the above, but the present application is by no means limited to the above-described embodiment, instead allowing various modifications based on the technical concept of the present application.

For example, the materials and numerical values shown in the above-described embodiment are merely for exemplary purpose, so that any materials or numerical values different therefrom may be adoptable depending on needs. The battery pack using a lithium ion secondary battery is described in the embodiment, but any batteries other than lithium ion secondary battery may be used.

The hard laminating film preliminarily provided with the heat seal adhesive layer is adopted in the above-described embodiment, but the battery pack may be formed also by using a hard laminating film having no heat seal adhesive layer provided thereto, and a soft laminating film having the recess formed therein, and having a heat seal adhesive layer provided to the outer bottom surface of the recess.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a battery cell having a first opened end and a second opened end formed thereto;
a circuit board electrically connected to the battery cell;
a first cover housing the circuit board, and engaged with the first opened end; and
a second cover engaged with the second opened end, wherein;
the battery cell includes;
a battery element;
a rectangular first packaging component provided with at least a first metal layer, a first outer resin layer formed on one surface of the first metal layer, and a first inner resin layer formed on the other surface of the first metal layer, a recess being formed from the first inner resin layer side to the first outer resin layer side, and distance between the side periphery and the opposing side edge of the recess being not larger than the depth of the recess; and
a rectangular second packaging component provided with at least a second metal layer, a second outer resin layer formed on one surface of the second metal layer, and a second inner resin layer formed on the other surface of the second metal layer,
wherein;
the battery element is housed in the recess,
the first packaging component and the second packaging component are stacked so that the second packaging component covers the opening of the recess and the first packaging component does not cover the opening of the recess,
the periphery of the opening is sealed,
both ends of the second packaging component are abutted at the outer bottom surface of the recess of the first packaging component, and
the first outer resin layer and the second inner resin layer are bonded by a heat seal adhesive layer having a thickness of 1 μm or larger and 20 μm or smaller interposed between the outer bottom surface of the recess of the first packaging component and both ends of the second packaging component, as being preliminarily provided to the second packaging component, and wherein the heat seal adhesive layer is formed in a region excluding (a) edges of the second packaging component and (b) where the second packaging component faces the battery element and the first packaging component.

2. The battery pack as claimed in claim 1, wherein the heat seal adhesive layer is a heat seal adhesive resin having a melting point of 90° C. or higher and 180° C. or lower.

3. The battery pack as claimed in claim 2, wherein the heat seal adhesive layer is composed of an ethylene-vinyl acetate copolymer.

4. The battery pack as claimed in claim 3, wherein the heat seal adhesive layer has a thickness of 1 μm or larger and 5 μm or smaller.

5. The battery pack as claimed in claim 1, wherein width of seal at both side portions of the opening is not larger than thickness of the battery element.

6. The battery pack as claimed in claim 1, wherein the second metal layer of the second packaging component is composed of a hard metal material.

7. The battery pack as claimed in claim 6, wherein the hard metal material is composed of an unannealed aluminum (JIS A3003P-H18) or aluminum (JIS A3004P-H18).

8. The battery pack as claimed in claim 1, wherein the heat seal adhesive layer bonds the first packaging component and the second packaging component without covering the opening of the recess.

9. The battery pack as claimed in claim 1, wherein the heat seal adhesive layer is formed on the second packaging component by any one of gravure printing, screen printing, and flexographic printing.

10. The battery pack as claimed in claim 1, wherein a first part of the heat seal adhesive layer is formed on a first region of the second packaging component, and a second part of the heat seal adhesive layer is formed on a second region of the second packaging component, wherein the first region and the second region are separated by the recess of the first packaging component.

* * * * *